US012743914B2

(12) United States Patent
Kadam et al.

(10) Patent No.: US 12,743,914 B2
(45) Date of Patent: Sep. 22, 2026

(54) DIAGNOSTIC ARBITRATION SYSTEM FOR VEHICLES PERFORMING MULTIPLE DIAGNOSTIC TESTS

(71) Applicant: GM GLOBAL TECHNOLOGY OPERATIONS LLC, Detroit, MI (US)

(72) Inventors: Vijay Kadam, Northville, MI (US); Deepthi Shirahatti Laxmish, Wixom, MI (US); Emil Francu, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 18 days.

(21) Appl. No.: 18/915,508

(22) Filed: Oct. 15, 2024

(65) Prior Publication Data

US 2026/0105789 A1 Apr. 16, 2026

(51) Int. Cl.
*G07C 5/12* (2006.01)
*G07C 5/08* (2006.01)

(52) U.S. Cl.
CPC ............. *G07C 5/0808* (2013.01); *G07C 5/12* (2013.01)

(58) Field of Classification Search
CPC .... G07C 5/0808; G07C 5/12; B60R 16/0232; G06F 11/324; G06F 11/079; G06F 11/0739; G06F 11/3013; G05B 23/0248; G05B 2219/2637; G06N 5/04
See application file for complete search history.

(56) References Cited

U.S. PATENT DOCUMENTS

| | | | | |
|---|---|---|---|---|
| 6,289,332 B2 * | 9/2001 | Menig | B60K 35/26 | 340/439 |
| 7,308,616 B2 * | 12/2007 | Gollub | G06F 11/2294 | 714/48 |
| 7,577,872 B2 * | 8/2009 | DiBartolomeo | G06F 11/263 | 714/38.14 |
| 7,765,040 B2 * | 7/2010 | Underdal | G06Q 10/087 | 701/32.1 |

(Continued)

FOREIGN PATENT DOCUMENTS

| | | |
|---|---|---|
| CN | 113204226 A | 8/2021 |
| DE | 102018129013 A1 | 5/2019 |

OTHER PUBLICATIONS

Reichenbach et al., Robust and integrated diagnostics for safety systems in the industrial domain, 2013, IEEE, p. 1385-1391 (Year: 2013).*

(Continued)

*Primary Examiner* — Mcdieunel Marc

(57) ABSTRACT

A diagnostic system for a vehicle includes: diagnostic modules implementing respective diagnostic tests on the vehicle based on whether respective sets of conditions are satisfied; and an arbitration module i) receiving requests generated by the diagnostic modules to perform the diagnostic tests, ii) determine priority levels of the diagnostic tests, and iii) based on the priority levels, generate one or more diagnostic responses indicating permission to execute at least one of the diagnostic tests having a highest priority level and not granting permission to at least one other one of the diagnostic tests. One or more of the diagnostic modules, in response to the indicated permission, performs the at least one of the diagnostic tests prior to performing the at least one other one of the diagnostic tests.

20 Claims, 5 Drawing Sheets

(56) References Cited

U.S. PATENT DOCUMENTS

| | | | | |
|---|---|---|---|---|
| 7,865,278 | B2 * | 1/2011 | Underdal | G06N 7/00 702/182 |
| 8,239,094 | B2 * | 8/2012 | Underdal | G01M 17/007 701/31.4 |
| 9,688,243 | B2 * | 6/2017 | Gray | B60R 25/00 |
| 11,037,070 | B2 * | 6/2021 | Salganicoff | G06N 20/00 |
| 2008/0059106 | A1 * | 3/2008 | Wight | G06F 11/3688 714/E11.207 |
| 2012/0143016 | A1 * | 6/2012 | Wittliff | G06N 5/02 600/300 |
| 2012/0317127 | A1 * | 12/2012 | Friedlander | G06F 16/285 707/752 |
| 2013/0204640 | A1 * | 8/2013 | Underdal | G06Q 10/20 705/3 |
| 2015/0144077 | A1 * | 5/2015 | Rimkus | B60W 10/06 123/2 |
| 2015/0331734 | A1 * | 11/2015 | Joshi | G06F 11/079 714/33 |
| 2017/0162199 | A1 * | 6/2017 | Palanisamy | G06F 11/22 |
| 2021/0342686 | A1 * | 11/2021 | Kothari | G06N 3/09 |
| 2023/0019631 | A1 * | 1/2023 | Grady | G06F 18/214 |
| 2023/0110616 | A1 * | 4/2023 | Mracek | B60R 16/0232 701/29.1 |
| 2025/0206301 | A1 * | 6/2025 | Jin | B60W 30/143 |

OTHER PUBLICATIONS

Delatore The 5ESS switching system: Factory system testing, 1985, IEEE, p. 1537-1558 (Year: 1985).*

Zamriy, Diagnostics and Protection Control for Iren Linac Test Facility, 2005, IEEE, p. 1-3 (Year: 2005).*

Campos et al., A reference architecture for remote diagnostics and prognostics applications, 2002, IEEE, p. 842-853 (Year: 2002).*

German Office Action from counterpart DE1020241358548, dated Sep. 23, 2025.

* cited by examiner

DIAGNOSTIC ARBITRATION SYSTEM FOR VEHICLES PERFORMING MULTIPLE DIAGNOSTIC TESTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to on-board vehicle diagnostic systems.

Electric vehicles (EVs) such as battery electric vehicles (BEVs), hybrid vehicles, and/or fuel cell vehicles include one or more electric machines and a battery system. The battery system includes one or more battery cells, modules and/or packs that are connected in series and/or parallel and used to power electrical motors and other electrical devices of the vehicle. The vehicles can perform various diagnostic tests to determine the statuses of various vehicle systems, devices, and components.

SUMMARY

A diagnostic system for a vehicle is disclosed. The diagnostic system includes: diagnostic modules configured to implement respective diagnostic tests on the vehicle based on whether respective sets of conditions are satisfied; and an arbitration module configured to i) receive one or more requests generated by one or more of the diagnostic modules to perform a first one or more of the diagnostic tests, ii) determine priority levels of the first one or more of the diagnostic tests, and iii) based on the priority levels, generate one or more diagnostic responses indicating permission to execute at least one of the first one or more of the diagnostic tests having a highest priority level and not granting permission to at least one other one of the first one or more of the diagnostic tests. One or more of the diagnostic modules, in response to the indicated permission, performs the at least one of the first one or more of the diagnostic tests prior to performing the at least one other one of the first one or more of the diagnostic tests.

In other features, the arbitration module is configured to determine the priority levels of the first one or more of the diagnostic tests based on a current vehicle mode.

In other features, the arbitration module is configured to determine timeout periods for the first one or more of the diagnostic tests, and in response to one of the timeout periods exceeding a set threshold, ceasing execution of the at least one of the first one or more of the diagnostic tests.

In other features, the arbitration module is configured to determine the timeout periods of the first one or more of the diagnostic tests based on a current vehicle mode.

In other features, the arbitration module is configured to determine timeout periods for the first one or more of the diagnostic tests, and in response to a maximum one of the timeout periods exceeding a set threshold, ceasing execution of the at least one of the first one or more of the diagnostic tests.

In other features, the arbitration module is configured to determine settling times for the first one or more of the diagnostic tests, and in response to at least one of the settling times lapsing, executing a second one or more diagnostic tests. The second one or more diagnostic tests includes the at least one other one of the first one or more of the diagnostic tests. The second one or more diagnostic tests having a lower priority level than the first one or more of the diagnostic tests.

In other features, the arbitration module is configured to determine the settling times of the first one or more of the diagnostic tests based on a current vehicle mode.

In other features, the arbitration module is configured to determine settling times for the first one or more of the diagnostic tests, and in response to a maximum one of the settling times lapsing, executing a second one or more diagnostic tests. The second one or more diagnostic tests includes the at least one other one of the first one or more of the diagnostic tests. The second one or more diagnostic tests have a lower priority level than the first one or more of the diagnostic tests.

In other features, the second one or more diagnostic tests are performed subsequent to completion or timeout of the first one or more of the diagnostic tests.

In other features, the first one or more of the diagnostic modules concurrently perform the at least one of the first one or more of the diagnostic tests.

In other features, the first one or more of the diagnostic tests include a first diagnostic test that affects a parameter monitored by a second diagnostic test of the first one or more of the diagnostic tests.

In other features, the first one or more of the diagnostic tests include: a first diagnostic test that adjusts a voltage between a negative terminal of a power source and a chassis ground of the vehicle to evaluate a resistance between the negative terminal of the power source and the chassis ground; and a second diagnostic test that monitors the voltage to determine whether a contactor associated with supplying power from the power source to a load is stuck open or stuck closed.

In other features, the arbitration module is configured to permit execution of the second diagnostic test subsequent to i) executing of the first diagnostic test, and ii) lapsing of a settling time for the voltage after completion or time out of the first diagnostic test.

In other features, a diagnostic method is disclosed and includes: determining at multiple diagnostic modules of a vehicle whether respective sets of conditions are satisfied for performing diagnostic tests on the vehicle; generating requests to perform a first one or more of the diagnostic tests when a corresponding one or more of the sets of conditions are satisfied for the one or more of the diagnostic tests; waiting for permission from an arbitration module of the vehicle to perform the first one or more of the diagnostic tests; and executing the one or more of the diagnostic tests with highest priority in response to the arbitration module providing granted permission for at least one of the one or more of the diagnostic tests and performing other ones of the one or more of the diagnostic tests subsequent to executing the at least one of the one or more of the diagnostic tests.

In other features, the diagnostic method further includes ceasing execution of the at least one of the one or more of the diagnostic tests in response to the arbitration module determining that the at least one of the one or more of the diagnostic tests have timed out.

In other features, the diagnostic method further includes executing the other ones of the one or more of the diagnostic tests after a settling time has lapsed for the at least one of the one or more of the diagnostic tests.

In other features, a diagnostic method is disclosed and includes: receiving at an arbitration module of a vehicle one or more requests to perform one or more diagnostic tests on the vehicle; determining priority levels of the one or more diagnostic tests; determining which of the one or more diagnostic tests have a highest priority level; and generating one or more responses permitting first ones of the one or more diagnostic tests with the highest priority level to be executed and one or more responses not permitting execution of second ones of the one or more diagnostic tests.

In other features, the diagnostic method further includes: determining timeout periods for the first ones of the one or more diagnostic tests; monitoring status of the first ones of the one or more diagnostic tests being executed; determining whether the first ones of the one or more diagnostic tests have timed out based on the timeout periods; and in response to determining that at least one of the first ones of the one or more diagnostic tests have timed out, generating responses to cease execution of the first ones of the one or more diagnostic tests.

In other features, the diagnostic method further includes: determining settling times for the first ones of the one or more diagnostic tests; and subsequent to completing execution of the first ones of the one or more diagnostic tests or ceasing execution of first ones of the one or more diagnostic tests, waiting one of the settling times before granting permission to execute the second ones of the one or more diagnostic tests.

In other features, the diagnostic method further includes: based on a vehicle operating mode, determining the priority levels, timeout periods, and settling times of the one or more diagnostic tests; ceasing execution of the one or more diagnostic tests based on the timeout periods; and waiting the settling times after execution or timeout of the first ones of the one or more diagnostic tests before executing the second ones of the one or more diagnostic tests.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may concurrently run multiple diagnostic tests. One or more of the diagnostic tests may monitor one or more parameters that are adjusted and/or changed as a result of performing one or more of the other diagnostic tests. This can result in false positives and/or false negatives (e.g., false failures indicated for one or more systems, devices and/or components). The running of a first diagnostic test can negatively affect the running and/or results of a second diagnostic test, which may be concurrently and/or sequentially executed relative to the first diagnostic test.

The examples set forth herein include a diagnostic arbitration system for prioritizing diagnostic tests performed by diagnostic modules and concurrently and/or sequentially running the diagnostic tests. The priority levels of the diagnostic tests are calibratable and based on vehicle modes of operation. In some embodiments, each of the diagnostic tests, which may be implemented by respective diagnostic modules, has a calibratable timeout period and a settling time.

A timeout period (or timeout time) refers to a period, which if exceeded, results in the corresponding diagnostic test being stopped. In an embodiment, a calibratable timeout period is provided for each diagnostic test and vehicle mode. Thus, multiple different timeout periods may be provided for a particular diagnostic test, where each timeout period is for a respective vehicle mode occurring during execution of the particular diagnostic test. The timeout period is implemented such that a current diagnostic test runs a limited (or set maximum) amount of time in order to allow other diagnostic tests to run. For example, when the current running diagnostic test is stuck and/or is unable to make a decision, the current diagnostic test is stopped to allow other diagnostic tests to run.

A settling time (or settling period) refers to an amount of time after a first diagnostic test is performed or stopped before another (or next) diagnostic test is permitted to be performed. This allows parameters affected by the first diagnostic test to settle prior to executing another diagnostic test, which may be affected by one or more of these parameters. When active diagnostic modules manipulate parameters (e.g., voltages) that are monitored by other inactive diagnostic modules, settling periods are implemented to allow the parameters to relax to stable (default and/or idle) states. The next diagnostic tests are then permitted to start from know settled, default and/or idle states. If settling periods are not implemented, then subsequently performed diagnostic tests may generate false positives or false negatives.

Figure 1:
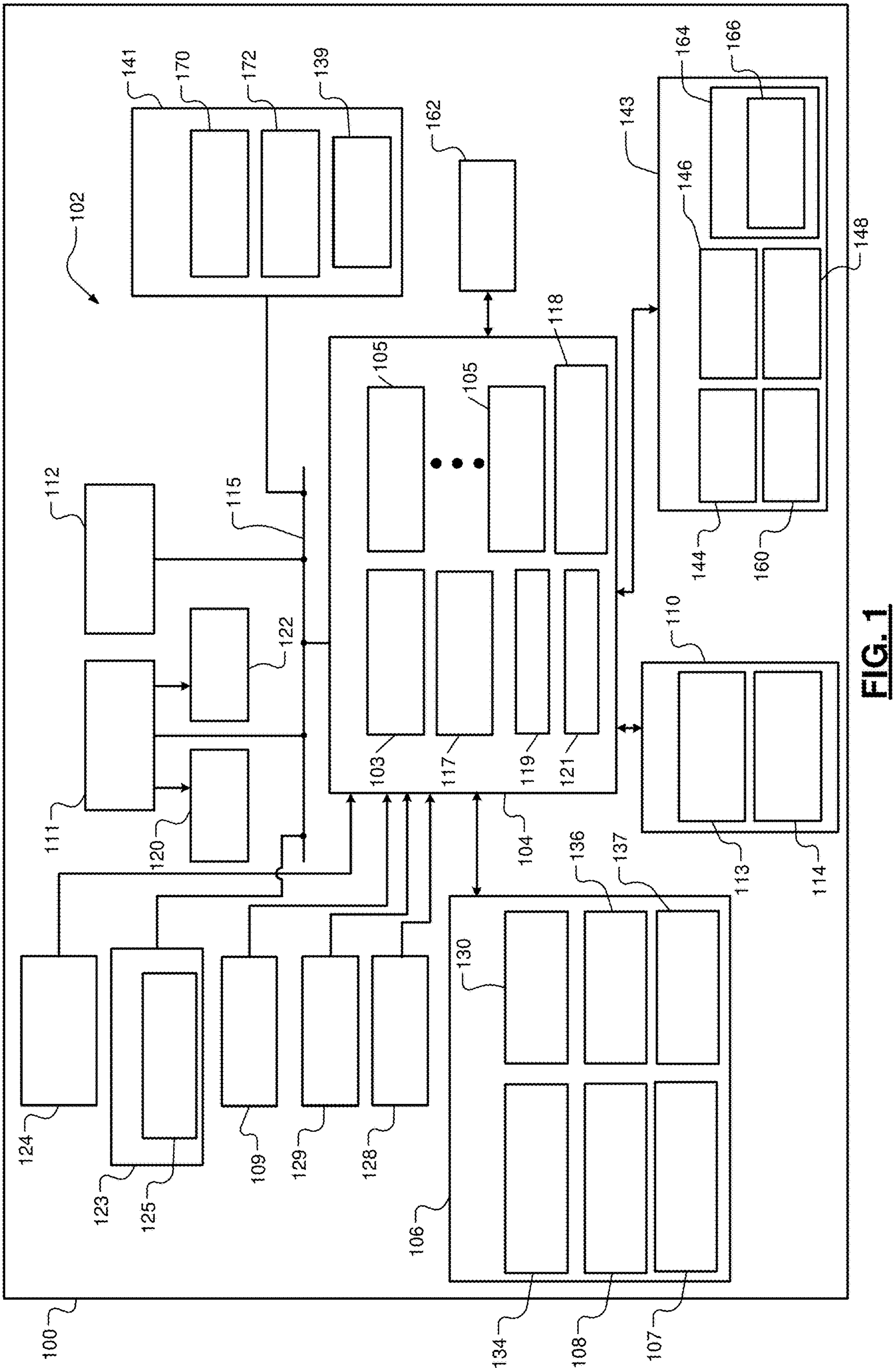
FIG. 1 is a functional block diagram of a host vehicle including an example diagnostic arbitration system in accordance with the present disclosure.

FIG. 1 shows a host vehicle 100 including a diagnostic arbitration system 102 including an arbitration module 103. Although the arbitration module 103 is shown as being implemented at a vehicle control module 104, the arbitration module 103 may separate from the vehicle control module 104. The arbitration module 103 arbitrates diagnostic requests to perform diagnostic tests. The diagnostic requests may be provided by diagnostic modules 105, which may execute respective diagnostic tests. The diagnostic modules 105 may set diagnostic request flags 107 in the memory 106 and/or send request signals to the arbitration module 103 when requesting permission to execute the diagnostic tests. Various diagnostic tests may be performed, which may be based on various vehicle parameters 108, such as voltages, current levels, resistances, ON and OFF statuses of one or more systems and/or devices, pressures, temperatures, vehicle speed, output torque of power source (e.g., motor or engine), etc. The vehicle parameters 108 may be stored in the memory 106. Some example diagnostic tests include: testing whether a contactor is stuck open or stuck closed; testing voltage of chassis to determine if there is potential for a user (e.g., driver) to receive a shock when touching the host vehicle 100; testing whether a system or device is operating as intended; etc.

The host vehicle 100 may be a non-autonomous, partially autonomous, or fully autonomous vehicle. The host vehicle 100 may be non-electric, hybrid or fully electric vehicle. The host vehicle 100 may include a vision sensing (or perception) system 123 including object detection sensors 125, and other sensors 109. The host vehicle 100 may further include a power source 110, an infotainment module 111 and other control modules 112. The power source 110 includes one or more battery packs (one battery pack 113 is shown) and a control circuit 114. The object detection sensors 125 may include cameras, radar sensors, lidar sensors, etc. The other sensors 109 may include temperature sensors, accelerometers, a gyroscope, a steering angle sensor, wheel speed sensors, a vehicle velocity sensor, and/or other sensors. The modules 103, 104, 105, 111, 112, 117, 118 may communicate with each other and have access to the memory 106 via one or more buses and/or network interfaces 115. The network interfaces 115 may include a controller area network (CAN) bus, a local interconnect network (LIN) bus, an Ethernet network interface, an auto network communication protocol bus, and/or other network bus.

The vehicle control module 104 controls operation of vehicle systems. The vehicle control module 104 may further include timeout timers 119 and settling timers 121. The timeout timers 119 are used to determine whether the diagnostic modules 105 when permitted to execute diagnostic tests time out prior to completing the diagnostic tests. The settling timers 121 are used to allow vehicle parameters to settle prior to performing another diagnostic test that may be affected by the vehicle parameters. In an embodiment, each of the diagnostic modules 105 has a respective timeout period and settling time.

The mode selection module 117 and/or the arbitration module 103 may select a vehicle operating mode. The parameter adjustment module 118 may be used to adjust, obtain and/or determine parameters of the host vehicle 100 based on, for example, signals from the sensors 125, 109 and/or other devices and modules referred to herein.

The host vehicle 100 may further include the display 120, an audio system 122, and one or more transceivers 124. The display 120 and/or audio system 122 may be implemented along with the infotainment module 111 as part of an infotainment system. The display 120 and/or audio system 122 may indicate error messages, diagnostic alert messages, diagnostic results, etc.

The host vehicle 100 may further include a global positioning system (GPS) receiver 128 and a MAP module 129. The GPS receiver 128 may provide vehicle velocity and/or direction (or heading) of the vehicle and/or global clock timing information. The GPS receiver 128 may also provide vehicle location information including lane information. The MAP module 129 provides map information. The map information may include traffic control objects, routes being traveled, and/or routes to be traveled between starting locations (or origins) and destinations. The vision sensing system 123, the GPS receiver 128 and/or the MAP module 129 may be used to determine location of objects and position of the host vehicle 100 relative to the objects. This information may also be used to determine i) heading information of the host vehicle 100 and/or the objects, and ii) a relative speed of the host vehicle 100 relative to the objects.

The memory 106 may store sensor data 130, vehicle parameters 132, diagnostic applications 134, and other applications 136. The memory 106 may further store the diagnostic request flags 107 as well as diagnostic response flags 137. The diagnostic modules 105 may set the diagnostic request flags 107 when requesting to perform the diagnostic tests. The diagnostic response flags 137 may be set by the arbitration module 103 when granting or denying permission for the diagnostic modules 105 to perform the respective diagnostic tests. The arbitration module 103 may periodically check the diagnostic request flags 107, determine priority levels of the diagnostic request flags 107 that are TRUE and, based on the priority levels, set the diagnostic response flags 137.

The applications 136 may include applications executed by the modules 104, 111, 112. Although the memory 106 and the vehicle control module 104 are shown as separate devices, the memory 106 and the vehicle control module 104 may be implemented as a single device. The memory 106 may be accessible to an electronic brake control module (EBCM) 139 of a brake control system 141.

The vehicle control module 104 may control operation of a propulsion system 143 that includes an engine 144, a converter/generator 146, a transmission 148, and/or electric motors 160, as well as control operation of the brake control system 141 and/or a steering system 162 according to parameters set by the modules 103, 104, 105, 111, 112, and 117-119. The vehicle control module 104 may set some of the vehicle parameters 108 based on signals received from the sensors 125, 109. The vehicle control module 104 may receive power from the power source 110, which may be provided to the brake control system 141, the engine 144, the converter/generator 146, the transmission 148, the electric motors 160 and/or the steering system 162, etc. Some of the vehicle control operations may include enabling fuel and spark of the engine 144, starting and running the electric motors 160, powering any of the systems 102, 141, 143, 162, and/or performing other operations as are further described herein.

The engine 144, the converter/generator 146, the transmission 148, the brake actuator system 158, the electric motors 160 and/or the steering system 162 may include actuators controlled by the vehicle control module 104 to, for example, adjust fuel, spark, air flow, steering wheel angle, throttle position, pedal position, etc. This control may be based on the outputs of the sensors 125, 109, the GPS receiver 128, the MAP module 129 and the above-stated data and information stored in the memory 106. The vehicle control module 104 may determine various vehicle parameters including voltages, current levels, a vehicle speed, an engine speed, an engine torque, yaw angle, yaw rate, a gear state, an accelerometer position, a brake pedal position, an amount of regenerative (charge) power, understeer coefficient and/or value, oversteer coefficient and/or value, and/or other parameters. These parameters may be stored in the memory 106. The propulsion system 143 may also include one or more axles 164 including one or more differentials 166 of one or more axles 164 of the host vehicle 100.

As an example, the brake control system 141 may be implemented as a brake-by-wire system, such as an electro-mechanical braking system or an electro-hydraulic braking system. In an embodiment, the brake control system 141 may include the EBCM 139, a brake actuator 170 and a brake actuator sensor 172. The brake actuator 170 may include a traditional style brake pedal and/or other brake actuator, such as a handheld brake actuator. The brake actuator sensor 172 detects the position of the brake actuator 170, which is used to determine displacement of the brake actuator 170. The EBCM 139 may include a motor (or pump) and an electronic control module for controlling the operation of the motor. The motor may adjust brake pressure. The brake pressure may refer to pressure of a hydraulic fluid used to actuate brake pads. In an electromechanical configuration, the motor is not included.

In an embodiment, each diagnostic test (or algorithm) performed by the diagnostic modules 105 is implemented independently of the other diagnostic tests (or algorithms) performed by the diagnostic modules 105. In another embodiment, one or more diagnostic tests are implemented and depend on one or more other diagnostic tests. Subsequent to being permitted to execute the diagnostic tests, the diagnostic modules 105 execute the diagnostic tests independently of the arbitration module 103. The diagnostic modules 105 may each perform the method of FIG. 4. The arbitration module 103 may be referred to as a "centralized arbiter" and may implement the method of FIG. 5 for various different types of diagnostic tests.

In an embodiment, the priority levels of the diagnostic tests are based on the vehicle mode. An example of one vehicle mode is an ON or OFF status of the host vehicle 100. When a vehicle is powered ON and power is available for the electric motors 160, the host vehicle 100 has an ON vehicle mode status. If power is not available for the motor(s), then the host vehicle 100 has an OFF vehicle mode status. Table 1 shows some examples of priority levels of diagnostic tests 1-4 for a first mode and a second mode. In an embodiment, Mode 1 is the OFF vehicle mode and Mode 2 is the ON vehicle mode. A priority level of 0 indicates that there is no priority level for the corresponding diagnostic test. A priority level of 1 is a highest priority level. Each priority level greater than 1 has a lower priority than the priority level of 1. The higher the priority level number, the lower the priority. For example, a priority level of 2 has a lower priority than a priority level of 1. Similarly, a priority level of 3 has a lower priority than a priority level of 2. When there are two or more diagnostic tests of equal priority for which execution requests have been generated, then the two or more diagnostic tests are executed concurrently.

TABLE 1

Diagnostic Priority Based on Vehicle Mode

| | Vehicle Mode | |
|---|---|---|
| Diagnostic Number | Mode 1 | Mode 2 |
| Diagnostic 1 | 0 | 1 |
| Diagnostic 2 | 0 | 1 |
| Diagnostic 3 | 0 | 1 |
| Diagnostic 4 | 0 | 2 |

Table 2 provides example timeout periods for respective diagnostic tests and associated vehicle modes. The vehicle modes of Table 2 may be the same as the vehicle modes of Table 1. As shown in Table 2, each of the diagnostic tests 1-4 has a different timeout period for each of Mode 1 and Mode 2.

TABLE 2

Timeout Calibration Table

| | Vehicle Mode | |
|---|---|---|
| Diagnostic Number | Mode 1 | Mode 2 |
| Diagnostic 1 | 5 seconds | 10 seconds |
| Diagnostic 2 | 5 seconds | 10 seconds |
| Diagnostic 3 | 5 seconds | 10 seconds |
| Diagnostic 4 | 5 seconds | 30 seconds |

Table 3 provides example settling times for diagnostics 1-4 and the vehicle modes Mode 1 and Mode 2. The modes of Table 3 may be the same as the modes of Table 1 and/or Table 2. As shown in Table 3, each of the diagnostic tests 1-4 has a different settling period for each of Mode 1 and Mode 2.

TABLE 2

Settling Time Calibration Table

| | Vehicle Mode | |
|---|---|---|
| Diagnostic Number | Mode 1 | Mode 2 |
| Diagnostic 1 | 5 seconds | 10 seconds |
| Diagnostic 2 | 5 seconds | 10 seconds |
| Diagnostic 3 | 5 seconds | 10 seconds |
| Diagnostic 4 | 5 seconds | 30 seconds |

Tables 1-3 may be stored in the memory 106 and accessed by the arbitration module 103. The priority levels, timeout periods and settling times may also be based on other vehicle modes.

Figure 2:
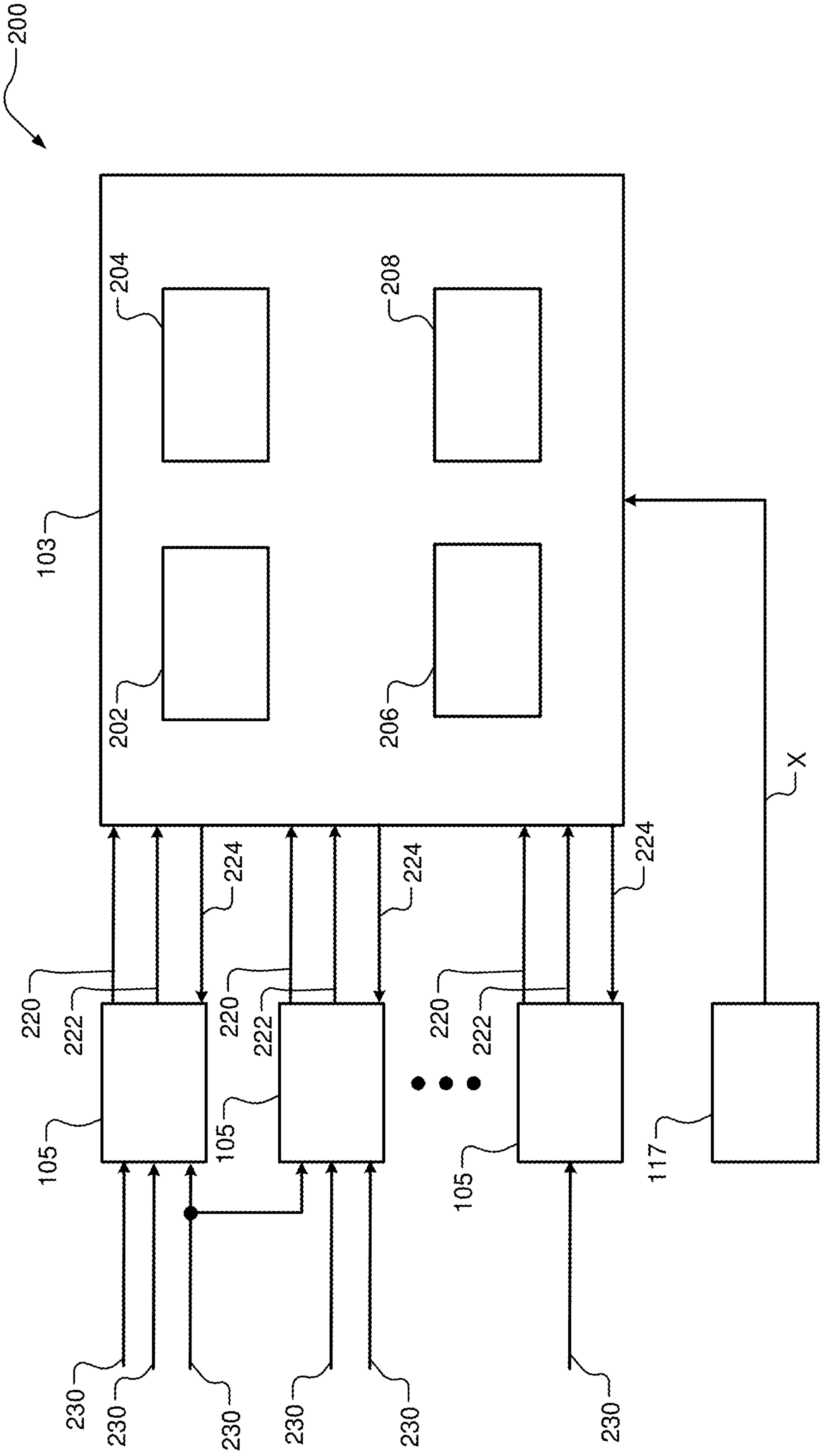
FIG. 2 is a functional block diagram of a portion of the diagnostic arbitration system of FIG. 1.

FIG. 2 shows a portion 200 of the diagnostic arbitration system 102 of FIG. 1. The portion 200 includes the arbitration module 103 and the diagnostic modules 105. The arbitration module 103 includes the priority module 202, a status monitoring module 204, a timeout module 206, and a settling time module 208. The priority module 202 determines the priority levels of the diagnostic modules 105 and corresponding diagnostic tests. The status monitoring module 204 monitors the status of diagnostic tests being performed including whether the diagnostic tests have completed. The timeout module 206 determines whether the diagnostic tests being performed have timed out. The settling time module 208 delays execution of a next one or more diagnostic tests based on a settling time of a previously executed one or more diagnostic tests, which can affect inputs and thus results of the next one or more diagnostic tests.

Each of the diagnostic modules 105 determines whether one or more conditions are satisfied for performing a corresponding diagnostic test. When the one or more conditions are satisfied, the corresponding diagnostic module requests that the diagnostic test be performed. This may include setting a diagnostic request flag and/or sending a diagnostic test request signal to the arbitration module 103. Example diagnostic test request signals 220 are shown. Each of the diagnostic modules 105 may check a respective set of one or more conditions and when satisfied generates a request to perform a corresponding diagnostic test.

The diagnostic modules 105 may generate status signals (e.g., status signals 222 are shown) that indicate the status of the diagnostic tests being executed. Some example statuses are "not timed out", "timed out", "not completed", and/or "completed". The arbitration module 103 generates response signals 224 indicating whether the diagnostic modules 105 are permitted to execute the corresponding diagnostic tests.

The diagnostic modules 105 may perform the diagnostic tests based on various inputs (or vehicle parameters). Some parameters 230 are shown as being provided to the diagnostic modules 105. Each of the diagnostic modules 105 may receive a different or overlapping set of vehicle parameters. One or more parameters may be monitored by multiple diagnostic modules. As an example, parameters may be monitored by both diagnostic modules and diagnostic module$_2$. One or more diagnostic modules may adjust one or more of the parameters and/or cause one or more of the parameters to change. The adjusted and/or changed parameters may be monitored by one or more other diagnostic modules. For example, a first diagnostic module may adjust a voltage when performing a first diagnostic test. Another diagnostic module may monitor and/or perform another diagnostic test based on that voltage.

The mode selection module 117 selects the vehicle operating mode and may indicate the vehicle operating mode to the arbitration module 103. The priority module 202 may determine the priority level for each diagnostic module and test based on the vehicle operating mode. The timeout module 206 may determine timeout values for the diagnostic modules and tests based on the vehicle operating mode. The settling time module 208 determines the settling times for the diagnostic modules and tests based on the vehicle operating mode. In an embodiment, the priority levels, timeout times, and settling times are stored as tables in memory (e.g., the memory 106 of FIG. 1).

Figure 3:
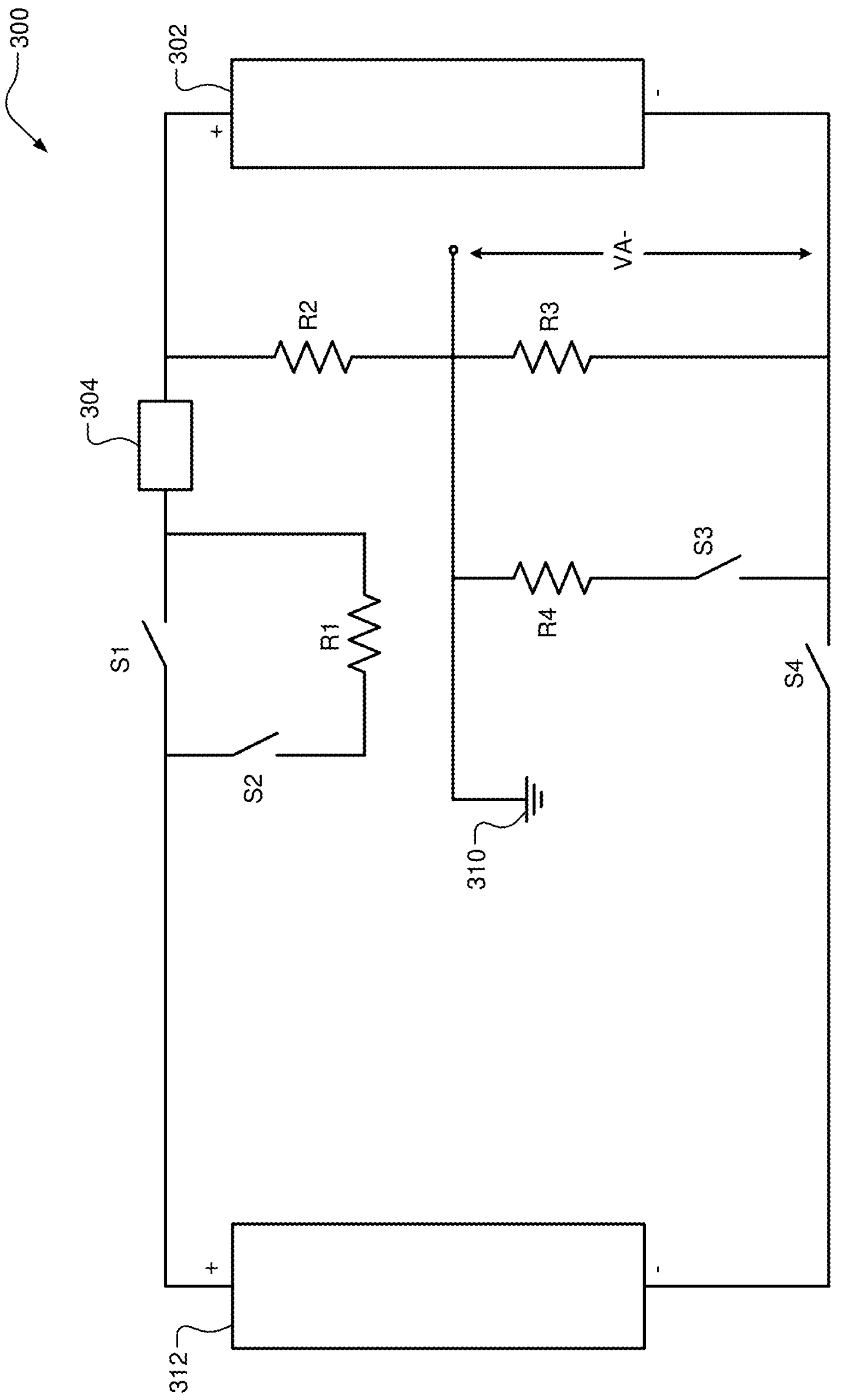
FIG. 3 is a schematic diagram of an example power supply system of the host vehicle of FIG. 1 for which multiple diagnostic tests are run in accordance with the present disclosure.

FIG. 3 shows an example power supply system 300 of the host vehicle 100 of FIG. 1 for which multiple diagnostic tests are run. The power supply system 300 includes a power source 302 (e.g., a battery pack), resistors R1-R4, switches S1-S4, and a fuse 304. The switches S1, S2 and S4 are contactors. Switch S2 is referred to as a precharge contactor. Switch S3 is referred to as an isolation bias switch. The resistors R2, R3 are connected in series and implemented as a voltage divider connected across terminals of the power source 302. The fuse is connected to the power source 302 and to the switch S1. The fuse 304 is connected to and between i) the power source 302 and resistor R2 and ii) the switch S1 and the resistor R1. The switch S2 is connected in series with the resistor R1. The series combination of the switch S2 and the resistor R1 is connected in parallel with the switch S1. The switches S1 and S2 are connected to the load 312. The resistor R4 is connected in series with the switch R3, which collectively are connected in parallel with the resistor R3. The resistors R2, R3, and R4 are connected to a reference terminal (or chassis ground terminal) 310. A load 312 is connected to the switches S1, S2 and S4. The switch S4 is connected to and between i) the load 312 and ii) the switch S3, the resistor R3, and the negative leg of the power source 302. The load 312 may refer to one or more vehicle components and/or devices, such as a vehicle bus, motors, heaters, compressor, lights, processors, etc.

As an example, a first (or isolation) diagnostic test may be performed on the power supply system 300 to determine a voltage VA− measured between a negative leg (or terminal) of the power source 302 and the chassis ground 310 and thus isolation of the chassis ground 310 relative to the power source 302. If the voltage VA− is greater than a set threshold, then a diagnostic alert flag is set indicating that there is a potential for a shock if a user touches the vehicle and/or chassis. While performing the first diagnostic test, the bias switch S3 is toggled between open and closed states in order to evaluate the electrical resistance measured from the negative leg of the power source 302 to the chassis ground 310. The voltage VA− is related to the electrical resistance. By toggling the switch S3, the voltage VA− changes. The voltage VA− is measured when the bias switch S3 is open and when the bias switch S3 is closed. The electrical resistance is calculated based on the chassis ground 310 (or center leg) and the negative leg (or terminal) the power source 302.

A second (or contactor stuck) diagnostic test may be performed on the power supply system 300 to determine if one or more of the switches S1-S4 are stuck open or stuck closed. The second diagnostic test is also based on the voltage VA− between the negative leg of the power source 302 and the chassis ground 310. In order to avoid basing operations associated with the second diagnostic test on the voltage VA−, which was changed during the first diagnostic test and can negatively affect the second diagnostic test, the arbitration module 103 of FIGS. 1-2 waits a settling time period. This prevents the diagnostic module of the second diagnostic test from generating a false failure associated with active isolation due to the voltage VA− becoming a low voltage value.

Figure 4:
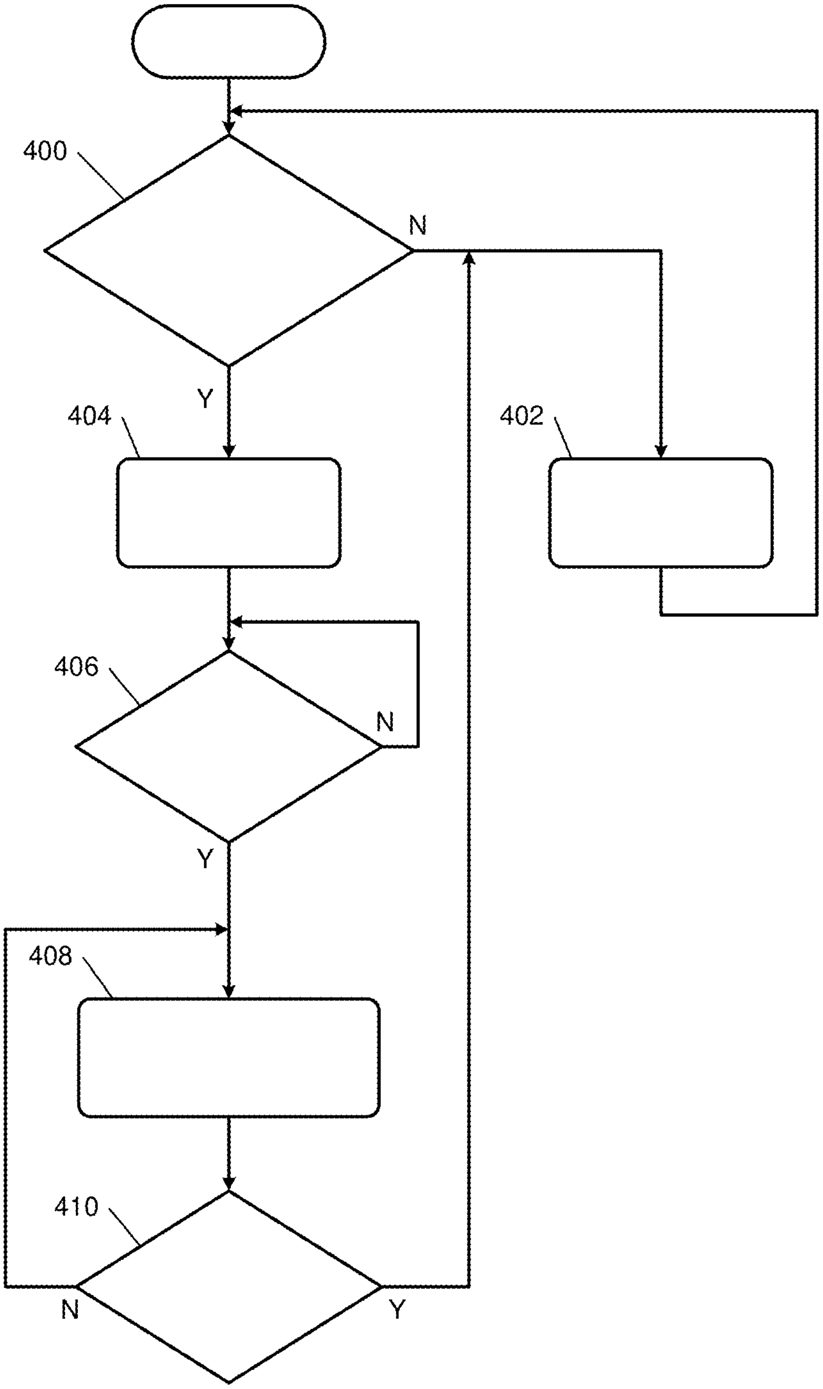
FIG. 4 illustrates a diagnostic testing method implemented by diagnostic modules in accordance with the present disclosure.
Figure 5:
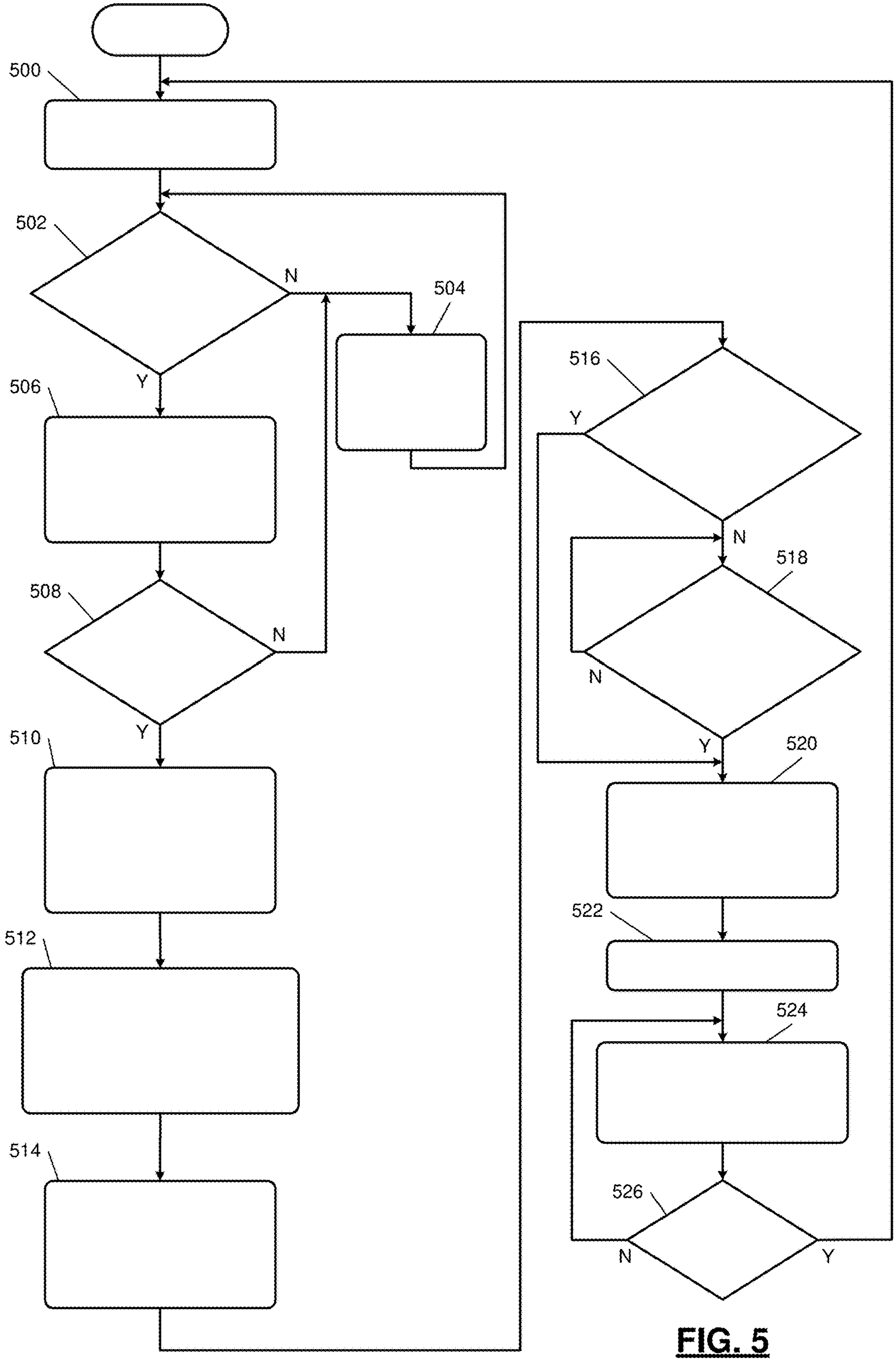
FIG. 5 illustrates a diagnostic arbitration method implemented by a diagnostic arbitration module in accordance with the present disclosure.

The following methods of FIGS. 4-5 may be performed concurrently.

FIG. 4 shows a diagnostic testing method that may be implemented by each of the diagnostic modules 105 of FIGS. 1-2. Two or more of the diagnostic modules 105 may each execute the diagnostic testing method, concurrently. In an embodiment, all of the diagnostic modules 105 concurrently perform this method. The following operations may be iteratively performed.

At 400, the diagnostic module determines whether the enable conditions have been satisfied for performing the diagnostic test of that diagnostic module. If not, operation 402 may be performed, otherwise operation 404 may be performed.

At 402, the diagnostic module sets a diagnostic request flag to FALSE. The diagnostic request flag may be a Boolean value of 0 or 1, where 0 is FALSE and 1 is TRUE. Operation 400 may be performed subsequent to operation 402.

At 404, the diagnostic module sets the diagnostic request flag to TRUE. In one embodiment, the diagnostic module sends a diagnostic request signal to the arbitration module 103 requesting execution of the diagnostic test.

At 406, the diagnostic module determines whether a diagnostic response is TRUE. The diagnostic response may be provided in response to the diagnostic request. In an embodiment, the arbitration module sends a diagnostic response signal to the diagnostic module. If yes, operation 408 may be performed.

At 408, the diagnostic module executes the diagnostic test. At 410, the diagnostic module determines whether a particular diagnostic is completed. If not, operation 408 is continued, otherwise operation 402 may be performed.

FIG. 5 shows a diagnostic arbitration method implemented by a diagnostic arbitration module. The following operations may be iteratively performed.

At 500, the arbitration module 103 sets a diagnostic request flag (DRF) (or diagnostic test routine) index X to 1. The index is used to refer to a diagnostic in an array of diagnostics. For example diagnostic test routines Diag[1], Diag[2], Diag[3] . . . . Diag[n] may exist, where X may refer to any one of the integers 1 to n. Logic goes over the diagnostics associated with the diagnostic test routine X and then increments X to the next diagnostic test routine, as stated below. At 502, the arbitration module 103 determines whether the diagnostic request flag for the current diagnostic test routine X is TRUE. If not, operation 504 may be performed, otherwise operation 506 may be performed.

At 504, the arbitration module 103 increments the diagnostic test routine index X. At 506, the arbitration module 103 determines the priority level, timeout threshold, and settling time of the diagnostic test routine X. This may include accessing tables indicating the priority level, timeout threshold and settling time.

At 508, the arbitration module 103 determines whether all diagnostic request flags have been checked (i.e., X equals the quantity (or total number) of diagnostic tests). If not operation 504 may be performed, otherwise operation 510 may be performed.

At 510, the arbitration module 103 determines which one or more of the diagnostic tests with TRUE diagnostic request flags has (or have) the highest priority level. This may include looking up and comparing the priority levels of the diagnostic tests with TRUE diagnostic request flags.

At 512, the arbitration module 103 sets the arbitration response flags TRUE to start the one or more of the diagnostic tests with the highest priority level. The diagnostic response flag may be a Boolean value of 0 or 1, where 0 is FALSE and 1 is TRUE.

At 514, the arbitration module 103 starts and/or increments timeout timer(s) for the one or more diagnostic tests with the highest priority level.

At 516, the arbitration module 103 determines whether the current one or more diagnostic test routines being performed are completed. If not completed, operation 518 is performed, otherwise operation 520 is performed. In an embodiment, the arbitration module 103 may determine if all of the one or more diagnostic test routines are completed before proceeding to operation 520.

At 518, the arbitration module 103 determines whether the one or more timeout timers of the one or more diagnostic test routines being performed are greater than or equal to respective thresholds. If yes, operation 520 may be performed. In an embodiment, the arbitration module 103 waits until all of the timeout timers of the one or more diagnostic test routines are greater than or equal to the respective thresholds before performing operation 520. In an embodiment when a current running diagnostic test is unable to complete, the arbitration module 103 waits the timeout period before permitting execution of the next diagnostic test. In another embodiment, when there are multiple diagnostic test routines running concurrently, the arbitration module waits a maximum of the diagnostic timeout times for the concurrently running diagnostic test routines before stopping execution of these tests and permitting execution of the next highest priority diagnostic test routines.

At 520, the arbitration module 103 sets one or more diagnostic response flags FALSE for the one or more diagnostic tests timed out.

At 522, the arbitration module 103 resets the timeout timers.

At 524, the arbitration module 103 starts and/or increments one or more settling timers for the completed or timed out diagnostic tests. The settling timers are implemented independent of whether the corresponding diagnostic tests timed out.

At 526, the arbitration module 103 determines whether the settling timers are expired. If yes, operation 500 may be performed. Arbitration module 103 waits the settling time (or "cooling time") before permitting a next one or more diagnostic tests to run to allow one or more inputs to the next one or more diagnostic tests to settle. After the settling time, the arbitration module 103 sets the arbitration response flag for the next one or more diagnostic tests to TRUE at 512. In an embodiment, the arbitration module 103 waits until all of the one or more settling timers have expired before performing operation 500.

After the current diagnostic tests have timed out and the settling times of the settling timers have lapsed, the arbitration module 103 stops the current diagnostic tests and executes the next highest priority diagnostic tests, which have been waiting to run. In an embodiment, if there are multiple diagnostic tests concurrently running, the arbitration module 103 waits the maximum of the timeout periods for the diagnostic tests before timing out and thus stopping execution of the diagnostic tests. When switching from executing a first one or more diagnostic tests to executing a second one or more diagnostic tests, the arbitration module 103 waits the maximum of the corresponding settling times of the first one or more diagnostic tests before executing the second one or more diagnostic tests. This is done to maximize the probabilities that the input parameters provided for the second one or more diagnostic tests are settled (or at steady state) before executing the second one or more diagnostic tests. In one embodiment, once the maximum time out period and maximum settling time has lapsed, the arbitration module 103 proceeds with the next highest ranked diagnostic test(s) that have TRUE diagnostic request flags.

The examples set forth herein include a centralized diagnostic arbitration module that implements calibratable priority-based arbitration and enablement of diagnostic tests, which may run concurrently and/or sequentially. The diagnostic tests may interact with each other (i.e., affect, monitor, and/or operate based on the same one or more parameters). The arbitration includes permitting execution of highest priority diagnostic tests and waiting settling times after execution of the highest priority diagnostic tests before permitting execution of lower priority diagnostic tests, which receive inputs that were affected by execution of the highest priority tests. The calibratable priority-based arbitration and enablement eliminates the possibility of false failures caused by these type of interactions. The centralized arbitration prevents false failures of diagnostics that run concurrently and/or sequentially and interact with each other.

The examples set forth herein allow conflicting diagnostic scenarios to be managed at a single location while actual diagnostic scenarios are independently implemented. The examples are applicable to various vehicle programs. The arbitration module is scalable to implement existing and new diagnostic tests. The arbitration module has a failsafe mechanism added to avoid any one diagnostic blocking execution of other diagnostics from running for long periods of time (i.e., timeout periods are provided to limit execution time of diagnostic tests). The arbitration module also implements settling times between diagnostic tests to assure that inputs for the next diagnostic test to be performed are settled down.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A diagnostic system for a vehicle, the diagnostic system comprising:

a plurality of diagnostic modules implemented in the vehicle and configured to implement respective diagnostic tests on circuitry of the vehicle based on whether respective sets of conditions are satisfied; and an arbitration module configured to i) receive one or more requests generated by one or more of the plurality of diagnostic modules to perform a first one or more of the diagnostic tests, ii) determine priority levels of the first one or more of the diagnostic tests, and iii) based on the priority levels, generate one or more diagnostic responses indicating permission to execute at least one of the first one or more of the diagnostic tests having a highest priority level and not granting permission to at least one other one of the first one or more of the diagnostic tests, wherein one or more of the plurality of diagnostic modules is configured, in response to the indicated permission, to perform the at least one of the first one or more of the diagnostic tests prior to performing the at least one other one of the first one or more of the diagnostic tests including monitoring and adjusting at least one of a voltage, a current level, a resistance, an ON and OFF state, a pressure, a temperature, and an output torque of at least one of the circuitry, a component of the circuitry, a power source of the vehicle, and a power supply system of the vehicle.

2. The diagnostic system of claim 1, wherein the arbitration module is configured to determine the priority levels of the first one or more of the diagnostic tests based on a current vehicle mode.

3. The diagnostic system of claim 1, wherein the arbitration module is configured to determine timeout periods for the first one or more of the diagnostic tests, and in response to one of the timeout periods exceeding a set threshold, ceasing execution of the at least one of the first one or more of the diagnostic tests.

4. The diagnostic system of claim 3, wherein the arbitration module is configured to determine the timeout periods of the first one or more of the diagnostic tests based on a current vehicle mode.

5. The diagnostic system of claim 1, wherein the arbitration module is configured to determine timeout periods for the first one or more of the diagnostic tests, and in response to a maximum one of the timeout periods exceeding a set threshold, ceasing execution of the at least one of the first one or more of the diagnostic tests.

6. The diagnostic system of claim 1, wherein:

the arbitration module is configured to determine settling times for the first one or more of the diagnostic tests, and in response to at least one of the settling times lapsing, executing a second one or more diagnostic tests;

the second one or more diagnostic tests including the at least one other one of the first one or more of the diagnostic tests;

the second one or more diagnostic tests having a lower priority level than the first one or more of the diagnostic tests; and the arbitration module is configured to determine the settling times of the first one or more of the diagnostic tests based on a current vehicle mode.

7. The diagnostic system of claim 1, wherein:

the arbitration module is configured to determine settling times for the first one or more of the diagnostic tests, and in response to a maximum one of the settling times lapsing, executing a second one or more diagnostic tests;

the second one or more diagnostic tests including the at least one other one of the first one or more of the diagnostic tests;

the second one or more diagnostic tests having a lower priority level than the first one or more of the diagnostic tests; and the second one or more diagnostic tests are performed subsequent to completion or timeout of the first one or more of the diagnostic tests.

8. The diagnostic system of claim 1, wherein the one or more of the plurality of diagnostic modules concurrently perform the at least one of the first one or more of the diagnostic tests.

9. The diagnostic system of claim 1, wherein the first one or more of the diagnostic tests comprise a first diagnostic test that affects a parameter monitored by a second diagnostic test of the first one or more of the diagnostic tests.

10. The diagnostic system of claim 1, wherein:

the first one or more of the diagnostic tests comprise a first diagnostic test that adjusts the voltage to evaluate the resistance between a negative terminal of the power source and a chassis ground, and a second diagnostic test that monitors the voltage to determine whether a contactor associated with supplying power from the power source to a load is stuck open or stuck closed;

the voltage is between the negative terminal of the power source and the chassis ground of the vehicle; and the arbitration module is configured to permit execution of the second diagnostic test subsequent to i) executing the first diagnostic test, and ii) lapsing of a settling time for the voltage after completion or time out of the first diagnostic test.

11. The diagnostic system of claim 1, wherein the one or more of the plurality of diagnostic modules comprises a first diagnostic test, which includes toggling a switch of the circuitry, while performing the at least one of the first one or more of the diagnostic tests, to evaluate an electrical resistance measured from a negative leg of the power source to a chassis ground.

12. The diagnostic system of claim 11, wherein:

the electrical resistance is calculated based on a voltage measured between the negative leg of the power source and the chassis ground; and the one or more of the plurality of diagnostic modules comprises a second diagnostic test, which includes determining whether a contactor is stuck based on the voltage, wherein the one or more of the plurality of diagnostic modules waits a settling time prior to performing the second diagnostic test.

13. The diagnostic system of claim 11, wherein:

the circuitry comprises a plurality of resistors and a plurality of switches connected between the power source and a load; and the voltage is measured across at least one of the plurality of resistors.

14. A diagnostic method comprising:

determining at a plurality of diagnostic modules of a vehicle whether respective sets of conditions are satisfied for performing a plurality of diagnostic tests on circuitry of the vehicle;

generating requests to perform a first one or more of the plurality of diagnostic tests when a corresponding one or more of the sets of conditions are satisfied for the one or more of the plurality of diagnostic tests;

waiting for permission from an arbitration module of the vehicle to perform the first one or more of the plurality of diagnostic tests; and executing the one or more of the plurality of diagnostic tests with highest priority in response to the arbitration module providing granted permission for at least one of the one or more of the plurality of diagnostic tests and performing other ones of the one or more of the plurality of diagnostic tests subsequent to executing the at least one of the one or more of the plurality of diagnostic tests, wherein executing the one or more of the plurality of diagnostic tests with the highest priority includes monitoring and adjusting at least one of a voltage, a current level, a resistance, an ON and OFF state, a pressure, a temperature, and an output torque of at least one of the circuitry, a component of the circuitry, a power source of the vehicle, and a power supply system of the vehicle.

15. The diagnostic method of claim 14, further comprising ceasing execution of the at least one of the one or more of the plurality of diagnostic tests in response to the arbitration module determining that the at least one of the one or more of the plurality of diagnostic tests have timed out.

16. The diagnostic method of claim 14, further comprising executing the other ones of the one or more of the plurality of diagnostic tests after a settling time has lapsed for the at least one of the one or more of the plurality of diagnostic tests.

17. A diagnostic method comprising:

receiving at an arbitration module of a vehicle one or more requests to perform one or more diagnostic tests on circuitry of the vehicle;

determining priority levels of the one or more diagnostic tests;

determining which of the one or more diagnostic tests have a highest priority level; and generating one or more responses permitting first ones of the one or more diagnostic tests with the highest priority level to be executed and one or more responses not permitting execution of second ones of the one or more diagnostic tests, wherein executing the one or more of the diagnostic tests with the highest priority level includes monitoring and adjusting at least one of a voltage, a current level, a resistance, an ON and OFF state, a pressure, a temperature, and an output torque of at least one of the circuitry, a component of the circuitry, a power source of the vehicle, and a power supply system of the vehicle.

18. The diagnostic method of claim 17, further comprising:

determining timeout periods for the first ones of the one or more diagnostic tests;

monitoring status of the first ones of the one or more diagnostic tests being executed;

determining whether the first ones of the one or more diagnostic tests have timed out based on the timeout periods; and in response to determining that at least one of the first ones of the one or more diagnostic tests have timed out, generating responses to cease execution of the first ones of the one or more diagnostic tests.

19. The diagnostic method of claim 18, further comprising:

determining settling times for the first ones of the one or more diagnostic tests; and subsequent to completing execution of the first ones of the one or more diagnostic tests or ceasing execution of first ones of the one or more diagnostic tests, waiting one of the settling times before granting permission to execute the second ones of the one or more diagnostic tests.

20. The diagnostic method of claim 18, further comprising:

based on a vehicle operating mode, determining the priority levels, timeout periods, and settling times of the one or more diagnostic tests;

ceasing execution of the one or more diagnostic tests based on the timeout periods; and waiting the settling times after execution or timeout of the first ones of the one or more diagnostic tests before executing the second ones of the one or more diagnostic tests.

* * * * *